United States Patent [19]

de Paul Clark

[11] 3,926,894

[45] Dec. 16, 1975

[54] HARDENABLE, WATER-BASED COATING COMPOSITION FROM AQUEOUS LATICES OF ACRYLIC AND VINYL COMPOUNDS

[75] Inventor: Vincent de Paul Clark, Heath, Ohio

[73] Assignee: Owens-Corning Fiberglas Corporation, Toledo, Ohio

[22] Filed: Dec. 12, 1974

[21] Appl. No.: 532,073

Related U.S. Application Data

[63] Continuation-in-part of Ser. No. 368,156, June 8, 1973, abandoned.

[52] U.S. Cl. ............... 260/29.6 MP; 138/DIG. 1; 138/DIG. 7; 260/17 R; 260/17.4 ST; 260/30.6 R; 260/42.46; 260/42.55; 428/375

[51] Int. Cl.² ................. C08L 35/00; C08L 33/00; C04B 43/00

[58] Field of Search ...... 260/29.6 MP, 42.55, 42.43, 260/42.46, 42.48, 42.51, 42.52, 30.6 R

[56] References Cited

UNITED STATES PATENTS

| | | | |
|---|---|---|---|
| 3,311,585 | 3/1967 | Edlin | 260/42.55 X |
| 3,428,480 | 2/1969 | Wagner et al. | 260/29.6 MP X |
| 3,445,404 | 5/1969 | Ronden et al. | 260/29.6 MP X |
| 3,547,840 | 12/1970 | Stastny et al. | 260/42.55 X |
| 3,728,138 | 4/1973 | Kuehn | 260/29.6 MP X |

*Primary Examiner*—Lucille M. Phynes
*Attorney, Agent, or Firm*—Carl G. Staelin; John W. Overman; Patrick P. Pacella

[57] ABSTRACT

A water base, hardenable coating composition is disclosed for use on the inner or air conducting surfaces of fibrous glass thermal insulation employed in heating, cooling, or ventilating conduits. The coating comprises plasticizers, fillers, and binder.

7 Claims, No Drawings

HARDENABLE, WATER-BASED COATING COMPOSITION FROM AQUEOUS LATICES OF ACRYLIC AND VINYL COMPOUNDS

This is a continuation-in-part patent application of U.S. Pat. application Ser. No. 368,156, filed June 8, 1973 now abandoned.

This invention relates to a hardenable, water based coating composition. The coating is particularly useful when applied to the inner or air conducting surfaces of fibrous glass insulating materials used in rigid or flexible heating, cooling, or ventilating ducts.

Conduits and ducts either composed of or lined with fibrous glass insulation media such as batts, mats, boards, or the like are commonly used in heating, cooling, and ventilating systems. The construction and method of making these conduits is described in U.S. Pat. Nos. 3,092,529; 3,212,529; and 3,394,737. A protective coating or film is generally applied to the inner air directing surfaces of these ducts to insure a smooth, low friction producing surface being presented to air flowing through and being directed by the duct.

One such a coating composition is disclosed in U.S. Pat. application Ser. No. 205,288, filed Dec. 6, 1971. The coating of Ser. No. 205,288 is an aqueous dispersion of aluminum hydrate or magnesium hydrate, a latex binder, and sodium borate or boric acid.

A coating composition comprising an aqueous dispersion of plasticizers, fillers, and binder now have been discovered. The hardened coating compositions of this invention have been found to have exceptionally good hand, i.e. a very smooth surface.

Accordingly, an object of this invention is to provide a hardenable, water based coating composition.

Other objects, aspects, and advantages of this invention will be apparent to one skilled in the art from the following disclosure and appended claims.

The coating solids of this invention consist essentially of, by weight, 5 to 15 percent of the plasticizer, 55 to 85 percent of the filler, and 10 to 30 percent of the binder. Preferably, the amount of plasticizer ranges from 7 to 12 percent, the amount of filler ranges from 65 to 75 percent, and the amount of binder ranges from 5 to 15 percent.

The plasticizer of this invention is at least one halogenated organophosphorus compound. These plasticizers also are flame retardant. This can be a tris (haloalkyl) phosphate or a chlorinated phosphate ester. While the halogen portion of the tris (haloalkyl) phosphate can be chlorine, bromine, fluorine, or iodine, I prefer chlorine or bromine. Specific examples includes tris (2-chloroethyl) phosphate, tris (dichloropropyl) phosphate, tris (2,3-dibromopropyl) phosphate, and the like and mixture thereof.

The chlorinated phosphate ester has a molecular weight of 583 and the formula:

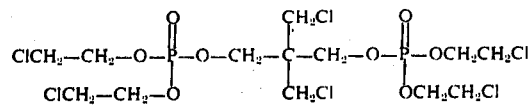

It can be purchased from Monsanto as Phosgard 2XC-20.

The flame retardant plasticizers of this invention preferably are added to the coating composition in the form of a water emulsion. Nonionic emulsifying agents such as polyalkylated vegetable oils, alcohols, and fatty acids generally are employed to emulsify the plasticizers. Polyoxyethylated agents are preferred.

The filler employed in this invention are naturally occurring materials such as calcium carbonate, talc, wollastonite, clay, barytes, silica, and the like and mixtures thereof. Calcium carbonate is preferred.

The particle size of the fillers employed have been found to affect the coatings of the invention. Fines (particle size under 2.5 microns) have high oil absorption. A high oil absorption requires more binder to hold the coating together. Coarse particle sizes are rough to the touch and cause poor hand. Generally, particle size distribution for the filler of this invention ranges from 5 to 30 microns. Preferably, no more than 5 weight percent of the filler has a particle size less than 2.5 microns and 98 weight percent of the filler has a particle size less than 25 microns. This particle size distribution permits higher pigment loadings, reduces cost, decreases flame spread, requires less binder, and provides good hand.

The binders of this invention are an aqueous latex of copolymers of acrylic resins and vinyl compounds. Acrylic resins are homopolymers or copolymers of acrylic acid, methacrylic acid, esters of these acids, or acrylonitrile. Vinyl compounds are compounds having the vinyl grouping ($CH_2$=$CH$-), specifically vinyl chloride, vinyl acetate, and similar esters. Other vinyl compounds include styrene, methyl methacrylate, and acrylonitrile. In some cases, such as acrylonitrile, the acrylic resin and vinyl compound are the same. In other cases, the binder copolymer contains 20 to 25 percent, by weight, of the acrylic resins and 75 to 80 percent, by weight, of the vinyl compounds. The binder of this invention also can be an aqueous latex of a copolymer of the acrylic resins and polyethylene. These latter copolymers would have 10 to 15 percent, by weight, of polyethylene and 85 to 90 percent, by weight, of the acrylic resins.

Each of the above plasticizers, fillers, and binders can be employed individually, or in combination within the stated proportions to produce coatings possessing comparable properties.

In addition to the above components, other additives can be used in minor amounts to tailor the coating to fit specific needs. A thickening agent may be added in amounts necessary to thicken the coating for brush or roller application, as opposed to spray applications where a thinner consistency is required. Although the amount of thickening agent used will depend upon the application consistency desired, satisfactory results have been obtained using 0.1 to 2 percent of a nonionic water soluble thickener. Excellent results have been obtained with cellulosic thickeners such as hydroxy methyl cellulose and hydroxy ethyl cellulose. Other thickeners which may be used include water dispersible gums, starches, and resins.

Fungicides or fungistats, generally in amounts of 0.1 to 2 percent can be used in cases where the air conducting duct will be exposed to humid, damp, or other atmospheric conditions conductive to fungus growth.

Additions of sodium tripolyphosphate have been found effective in aiding dispersion of the materials. Generally less than 1 to 2 percent is required.

From 0.1 to 2 percent additions of wetting agents have been found helpful. Similar additions of antifoaming agents can be employed if excess foaming is experienced during mixing.

If desired, water dispersions of carbon black and the like can be added to provide color to the coating composition.

The binder component of the coating composition holds together or binds the other stated ingredients (and other minor additives) after the coating has dried to a hardened, yet flexible, state on the fibrous glass insulation. The binder also bonds the coating to the fibrous glass.

These binders also impart the desired degree of flexibility to the coating after it has dried or hardened on the fibrous glass insulation surface. Flexibility is, of course, a key factor when the coating is used on flexible ducts of the type described in the previously mentioned U.S. Pat. No. 3,394,737.

The advantages of this invention further are illustrated by the following examples. The reactants, proportions, and other specific conditions are presented as being typical and should not be construed to limit the invention unduly.

EXAMPLE I

| Ingredients In Order of Addition | Amount |
| --- | --- |
| Total water | 163 gallons |
| Initial water | 120 gallons |
| Dispersing agent hydroxy methyl cellulose | 12 lbs. |
| Wetting agent octylphenoxypolyethoxyethanol | 24 lbs. |
| Thickening agent hydroxy ethyl cellulose | 12 lbs. |
| Binder, aqueous latex of a copolymer comprising about 80% vinyl acetate and about 20% butyl acrylate | 912 lbs. |
| Filler, Ca CO₃ | 3,150 lbs. |
| Anti-foaming agent hydrophobic silica type defoamer | 12 lbs. |
| Disperse 20 minutes at high speed | |
| Plasticizer emulsion | 409 lbs. |
| Carbon black dispersion | 900 lbs. |
| Fungicide: 2,3,5,6-tetrachloro-4-methyl sulfonyl pyridine | 12 lbs. |
| Add remainder of water | |

| PLASTICIZER EMULSION | |
| --- | --- |
| Ingredient | Amount |
| Water | 69 lbs. |
| Emulsifying agent, polyoxyethylated fatty alcohol | 21 lbs. |
| Emulsifying agent, polyoxyethylated vegetagle oil | 15 lbs. |
| Plasticizer, tris (2,3-dibromopropyl) phosphate | 152 lbs. |
| Plasticizer, chlorinated phosphate ester, Phosgard 2XC-20 | 152 lbs |

After all the ingredients were added to and mixed in a mixing tank, high speed mixing of from 10 to 15 minutes was employed to disperse all the ingredients. The coating then was applied to fibrous glass insulation by spraying, brushing, and the like.

The coating after application to and drying on a fibrous glass batt, in an amount equal to approximately 10 pounds per 400 square feet, was subjected to the ASTM E-84 tunnel fire hazard classification. This test showed a flame spread of 23 and a smoke rating of 0.

The above described compositions after application to and drying on fibrous glass insulation form a hardened, yet flexible, smooth surface which is highly efficient in minimizing air flow friction which may be caused by the insulating media of which a duct is either composed or lined. The coatings were found to have exceptionally good hand, and be moisture resistant to humid conditions. After dry heat soaking at 250°F for one week, flexibility characteristics are unchanged with no evidence of cracking.

The above-described coating compositions have been disclosed as being most suitable for use as coating on fibrous glass thermal insulation. They may also be used as coatings or paints on any surface where a hardened yet flexible coating is required along with low flame and smoke characteristics.

Although this invention has been described in considerable detail, it must be understood that such detail is for the purposes of illustration only and that many variations and modifications can be made by one skilled in the art without departing from the scope and spirit thereof.

I claim:

1. A coating composition for use on fibrous glass thermal insulation comprising an aqueous dispersion of coating solids, the solids consisting essentially of, by weight:
   a. 5 to 15 percent of a plasticizer of at least one halogenated organophosphorus compound of tris (haloalkyl) phosphate or a chlorinated phosphate ester having a molecular weight of 583 and the formula:

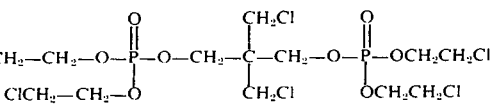

b. 55 to 85 percent of at least one filler wherein the filler has a particle size distribution ranging from 5 to 30 microns; and
   c. 10 to 30 percent of a binder of an aqueous latex of a copolymer of an acrylic resin and a vinyl compound or a copolymer of an acrylic resin and polyethylene, wherein the filler is calcium carbonate, talc wollastonite, clay, barytes or silica.

2. A coating composition according to claim 1 wherein no more than 5 weight percent of the filler has a particle size less than 2.5 microns and 98 weight percent of the filler has a particle size less than 25 microns.

3. A coating composition according to claim 1 wherein the amount of plasticizer ranges from 7 to 12 percent, the amount of filler ranges from 65 to 75 percent, and the amount of binder ranges from 5 to 15 percent.

4. A coating composition according to claim 1 wherein the plasticizer is tris (2-chloroethyl) phosphate, tris (dichloropropyl) phosphate, tris (2,3-dibromopropyl) phosphate, or a chlorinated phosphate ester.

5. A coating composition according to claim 1 wherein the halogen portion of the tris (haloalkyl) phosphate is chlorine or bromine.

6. A coating composition according to claim 1 wherein the acrylic resins are homopolymers or copolymers of acrylic acid, methacrylic acid, esters of acrylic acid, esters of methacrylic acid or acrylonitrile and the vinyl compounds vinyl chloride, vinyl acetate, styrene, methyl methacrylate or acrylonitrile.

7. A coating composition according to claim 1 wherein the plasticizer is tris (2,3-dibromopropyl) phosphate or a chlorinated phosphate ester, the filler is calcium carbonate, and the binder is an aqueous latex of a copolymer comprising about 80 percent, by weight, of vinyl acetate and about 20 percent, by weight, of butyl acrylate.

* * * * *